US012650616B2

(12) United States Patent
Wu

(10) Patent No.: US 12,650,616 B2
(45) Date of Patent: Jun. 9, 2026

(54) BONE CONDUCTION HEARING AID EYEGLASSES

(71) Applicant: Arts Opti Lab (Shenzhen) Company Limited, Shenzhen City (CN)

(72) Inventor: Yishan Wu, Shenzhen City (CN)

(73) Assignee: ARTS OPTI LAB (SHENZHEN) COMPANY LIMITED, Shenzhen City (CN)

( * ) Notice: Subject to any disclaimer, the term of this patent is extended or adjusted under 35 U.S.C. 154(b) by 272 days.

(21) Appl. No.: 18/511,881

(22) Filed: Nov. 16, 2023

(65) Prior Publication Data

US 2024/0430629 A1 Dec. 26, 2024

(30) Foreign Application Priority Data

Jun. 25, 2023 (CN) .......................... 202310749086.7

(51) Int. Cl.
*G02C 11/06* (2006.01)
*H04R 25/00* (2006.01)

(52) U.S. Cl.
CPC ............. *G02C 11/06* (2013.01); *H04R 25/60* (2013.01); *H04R 2460/13* (2013.01)

(58) Field of Classification Search
None
See application file for complete search history.

(56) References Cited

U.S. PATENT DOCUMENTS

| | | | | |
|---|---|---|---|---|
| 5,898,472 | A * | 4/1999 | Oshikawa | .............. G02C 3/003 |
| | | | | 351/156 |
| 6,332,682 | B1 * | 12/2001 | Yoshida | .............. G02C 5/2281 |
| | | | | 351/141 |
| 6,450,640 | B1 * | 9/2002 | Van Rysselberghe | ... G02C 5/00 |
| | | | | 351/123 |
| 10,582,295 | B1 * | 3/2020 | Zhong | .................. H04R 1/2876 |

(Continued)

FOREIGN PATENT DOCUMENTS

| | | |
|---|---|---|
| CN | 209089232 U | 7/2019 |
| CN | 111818435 B | 7/2021 |

*Primary Examiner* — Darryl J Collins
(74) *Attorney, Agent, or Firm* — MUNCY, GEISSLER, OLDS & LOWE, P.C.

(57) ABSTRACT

A pair of bone conduction hearing aid eyeglasses comprises a eyeglass mechanism, wherein at middle portions of both rear sides of the eyeglass mechanism are fixedly connected connection mechanisms, at sides of the connection mechanisms are fixedly connected bone conduction eyeglass leg mechanisms, outside rear-central portions of the bone conduction eyeglass leg mechanisms are sleeved rubber rings, at rear end portions of the bone conduction eyeglass leg mechanisms are fixedly provided connecting buckles, rear end portions of the connecting buckles are fixedly installed at front end portions of an anti-falling mechanism. By arranging bone conduction assemblies within the bone conduction leg mechanisms, patients with hearing impairments and myopia can achieve vision and hearing correction; connecting buckles are connected to automatically retractable anti-falling mechanism, so as to prevent the bone (Continued)

conduction hearing aid eyeglasses from failing off during vigorous movements, thus avoiding potential damage to the bone conduction hearing aid eyeglasses.

7 Claims, 5 Drawing Sheets

(56) References Cited

U.S. PATENT DOCUMENTS

| | | | |
|---|---|---|---|
| 2008/0309869 A1* | 12/2008 | Chen ..................... | G02C 5/143 |
| | | | 351/155 |
| 2012/0069293 A1* | 3/2012 | Cheong .................... | G02C 1/08 |
| | | | 351/90 |
| 2019/0250424 A1* | 8/2019 | Kahn ................. | B65H 75/4434 |
| 2021/0191152 A1* | 6/2021 | Helfet .................... | G02C 5/143 |
| 2021/0341761 A1* | 11/2021 | Taylor .................... | G02C 5/143 |
| 2022/0357599 A1* | 11/2022 | Howell .................. | G02C 5/001 |
| 2023/0049262 A1* | 2/2023 | Ruttenberg .............. | A61B 5/68 |
| 2024/0053621 A1* | 2/2024 | Foster ................. | H04M 1/6066 |
| 2024/0264463 A1* | 8/2024 | Lu .......................... | G02C 5/008 |

* cited by examiner

BONE CONDUCTION HEARING AID EYEGLASSES

TECHNICAL FIELD

The present invention relates to the technical field of hearing aid equipment, specifically a pair of bone conduction hearing aid eyeglasses.

BACKGROUND TECHNOLOGY

Bone conduction is a method of sound transmission that converts sound into mechanical vibrations of different frequencies. These vibrations are then transmitted through the skull, bony labyrinth, inner ear fluid, cochlea, and auditory pathways to convey sound waves. In contrast to the conventional sound transmission through the eardrum, bone conduction eliminates several steps in sound propagation, allows for clear sound reproduction even in noisy environments and does not affect others since the sound waves do not disperse in the air.

In China, according to the latest report, the number of people with deafness or hearing impairment has reached 27.8 million. These individuals with deafness or hearing impairment face significant challenges in their daily lives. With the advancement of bone conduction technology, an increasing number of people with deafness or hearing impairment are using bone conduction hearing aids. These devices help them regain the ability to hear sounds, enabling them to live and communicate normally.

However, bone conduction headphones typically require secure attachments to the ears of individuals with deafness or hearing impairment, which are commonly designed with hooks that hang on the ears or in semi-circular bands that rest on upper parts of the patients' ears, so as to prevent the bone conduction hearing aids from detaching during physical activities, and avoid leading to damage. For instance, registered Chinese patent with publication number CN111818435B discloses a bone conduction smart hearing aid which is a bone conduction earphone set into a semi-ring shape to wear on the patient's ears. Another example is a wireless bone conduction hearing aid disclosed in the registered Chinese patent document with publication number CN209089232U, which features hooks that hang on the patient's ears to prevent detachment while in motion. However, some patients also have nearsightedness and need to wear eyeglasses. In such cases, wearing bone conduction headphones becomes inconvenient or impossible because temple arms of eyeglasses also need to rest on ears, making it difficult to wear bone conduction headphones simultaneously.

SUMMARY OF INVENTION

Technical Problems to be Solved

In order to overcome shortcomings of prior art and solve technical problems, the present invention provides a pair of bone conduction hearing aid eyeglasses.

Technical Solutions

In order to achieve above purposes, the present invention provides following technical solutions: a pair of bone conduction hearing aid eyeglasses, comprises an eyeglass mechanism, wherein at middle portions of both rear sides of the eyeglass mechanism are fixedly connected connection mechanisms, at sides of the connection mechanisms are fixedly connected bone conduction eyeglass leg mechanisms, outside rear-central portions of the bone conduction eyeglass leg mechanisms are sleeved rubber rings, at lower end portions of the rubber rings are fixedly connected to rubber hooks, at rear end portions of the bone conduction eyeglass leg mechanisms are fixedly provided connecting buckles, rear end portions of the connecting buckles are fixedly installed at front end portions of an anti-falling mechanism.

Preferably, the eyeglass mechanism comprises eyeglass frames, a quantity of the eyeglass frames is two, inside the eyeglass frames are arranged eyeglass lenses, inner middle portions of the eyeglass frames are opened mounting grooves, lower portions of adjacent ends on rear sides of the eyeglass frames are fixedly connected to nose pads, upper end portions of adjacent sides of the eyeglass frames are fixedly connected to two ends of a connecting frame, and outer portions of the eyeglass lenses are snap-connected to inner portions of the mounting grooves.

Preferably, the connection mechanisms comprise rotary bases, sides of the rotary seats are fixedly connected to front end portions at adjacent sides of the bone conduction eyeglass leg mechanisms, inner portions of the rotary seats are rotationally connected to connecting ears by tightening adjustment screws, and front sides of the connecting ears are fixedly connected to middle portions of rear sides of the eyeglass frames.

Preferably, the bone conduction eyeglass leg mechanisms comprise eyeglass leg bodies, at front end portions of eyeglass leg bodies are evenly distributed through-holes, rear end portions of eyeglass leg bodies are provided with first connecting holes, rear end portions of eyeglass leg bodies are fixedly connected with anti-falling rubber pads, front end openings on sides of eyeglass leg bodies are fixedly connected to touch buttons, inside front end portions of the eyeglass leg bodies are fixedly connected sound recognizers, front end portions of inner middle portions of the eyeglass leg bodies are fixedly connected to chips, inner middle portions of the eyeglass leg bodies are fixedly connected to bone conductors, and inner rear sides of the eyeglass leg bodies are fixedly connected to magnetic rechargeable batteries.

Preferably, the magnetic rechargeable batteries are all electronically connected to the sound recognizers, the chips and the bone conductors through wires and the chips are all electronically connected to the touch buttons, the sound recognizers and the bone conductors through wires.

Preferably, the anti-falling mechanism comprises a collection bin, a middle portion of the collection bin is rotationally connected to a collection ring, at an intermediate portion of a rear side of the collection ring is opened a bayonet, inside the bayonet is fixedly connected a strap, both ends of the strap extend through middle opening on both sides of the collection bin, at both end portions of the strap are provided second connecting holes, a middle portion inside the collection bin is fixedly connected to a cross-shaped fixed sliding pole, outside a middle portion of the cross-shaped fixed sliding pole is fixedly connected a rebounder, outer portions of the rebounder are fixedly connected to inner middle portions of the collection ring, and at both upper and lower end portions of the cross-shaped fixed sliding pole are provided limiting assemblies.

Preferably, the limiting assemblies comprise pressers, inner portions of adjacent ends of the pressers are slidingly connected to outer peripheries of both ends of the cross-shaped fixed sliding poles, outer peripheries of an intermediate portion of the pressers are fixedly connected to limiting pieces, at adjacent end portions of the limiting pieces are fixedly connected springs, adjacent end portions of the springs are fixedly connected to limiting gear rings, and inner portions of the limiting gear rings are meshed with limiting gears.

Preferably, middle portions of outer peripheries of the pressers are slidingly connected to middle openings of upper and lower ends of the collection bin, inner peripheries of the limiting gears are slidingly connected to outer peripheries of upper and lower ends of the middle portion of the cross-shaped fixed sliding pole, inner peripheries of the limiting gear are fixedly connected to adjacent end portions of the pressers, and outer peripheries of the limiting gear rings are fixedly connected to upper and lower ends of middle portions of an inner wall of the collection ring.

The present invention has working principles as follows: when a patient wears the bone conduction hearing aid eyeglasses, firstly the rubber rings are slided to appropriate positions on the bone conduction eyeglass leg mechanisms, so as to allow the rubber hooks to securely attach to back portions of the patient's ears; then the connecting buckles are installed inside the first connecting holes, and the anti-falling mechanism is mounted at both ends within the connecting buckles; the pressers are pressed to disengage upper and lower limiting gears from the limiting ring and pull the collection bin, then the strap is pulled out from the collection bin; after that the pressers are released, and the pressers are driven to move away from each other by the limiting pieces and springs, thereby re-engaging the limiting gears and limiting gear rings to prevent the strap from retracting into the collection bin; after the bone conduction hearing aid eyeglasses is put on the patient's ears and the anti-falling mechanism is placed at a back side of the patient's head, the pressers are pressed again to disengage the limiting gears and the limiting gear rings, so that a rebounding force from the rebounder drives the collection ring to rotate inside the collection bin, thereby retracting the strap into the collection bin through the bayonet and winding the strap around the collection ring's outer periphery; when the collection bin and the strap are fully attached to the back side of the patient's head, the pressers are released to re-engage the limiting gears and limiting gear rings, preventing the strap from retracting further into the collection bin, by connecting the automatically retractable anti-falling mechanism to the first connecting holes at rear end portions of the eyeglass leg bodies, along with the rubber rings and rubber hooks, the bone conduction hearing aid eyeglasses can be worn without the risk of falling off during intense movements, avoiding damage to the eyeglasses. After putting the bone conduction hearing aid eyeglasses on and simply touching the touch buttons, the sound recognizers and bone conductors are activated through the chips. External sounds are conducted through the through-holes to the sound recognizers, which then transmit sound signals to the chips, and then the chips convert the sound signals into vibration signals and transmit them to the bone conductors. The bone conductors generate vibrations, causing the patient's skull to vibrate and transmit the vibration signals to the cochlea, restoring the sound signals collected by the sound recognizers. Bone conduction assemblies are arranged inside the bone conduction eyeglass leg mechanisms, which allows patients with hearing impairments and nearsightedness to simultaneously correct their vision and hearing, eliminating the discomfort of wearing both eyeglasses and bone conduction hearing aids at the same time.

Beneficial Effects

The present invention provides bone conduction hearing aid eyeglasses with following beneficial effects:

1. In the present invention, bone conduction assemblies are arranged inside the bone conduction eyeglass leg mechanisms, so that patients with both hearing impairments and nearsightedness can simultaneously correct their vision and hearing, thereby avoiding the discomfort of wearing both glasses and bone conduction hearing aids simultaneously.

2. In the present invention, automatically retractable anti-falling mechanism is connected to the first connecting holes at rear end portions of the eyeglass leg bodies through the connecting buckles, and works in conjunction with the rubber rings and rubber hooks, so as to ensure that the bone conduction hearing aid eyeglasses remain securely attached during intense physical activities and prevent the bone conduction hearing aid glasses from being damaged due to falling off caused by intense patient movement.

Figure 1:
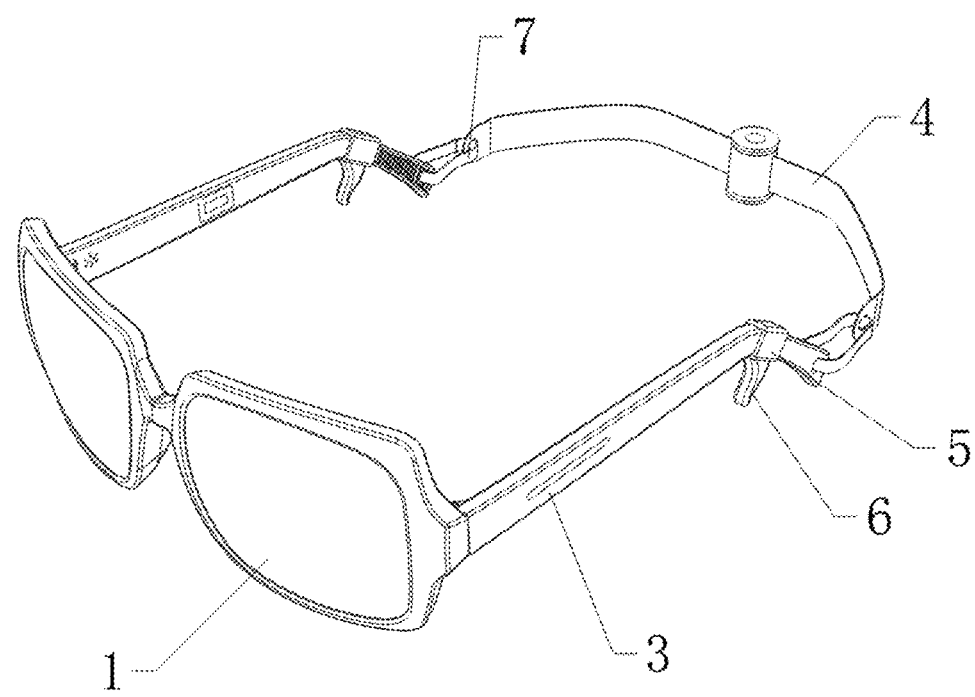
FIG. 1 is a first schematic perspective view of the present invention.

The markups in the drawings are indicated as follows:
1—eyeglass mechanism;
11—eyeglass frame;
12—eyeglass lens;
13—mounting groove;
14—nose pad;
15—connecting frame;
2—connection mechanism;
21—rotary base;
22—tightening adjustment screw;
23—connecting ear;
3—bone conduction eyeglass leg mechanism;
31—eyeglass leg body;
32—through-hole;
33—first connecting hole;
34—anti-falling rubber pad;
35—touch button;
36—sound recognizer;
37—chip;
38—bone conductor;
39—magnetic rechargeable battery;
4—anti-falling mechanism;
41—collection bin;
42—collection ring;

43—bayonet;
44—strap;
45—second connecting hole;
46—cross-shaped fixed sliding pole;
47—presser;
48—limiting piece;
49—spring;
410—limiting gear;
411—limiting gear ring;
412—rebounder;
5—rubber ring;
6—rubber hook
7—connecting buckle;
6—rubber hook; and
7—connecting buckle.

SPECIFIC EMBODIMENTS

The technical solutions in the embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without creative efforts shall fall within the scope of protection of the present invention.

Figure 2:
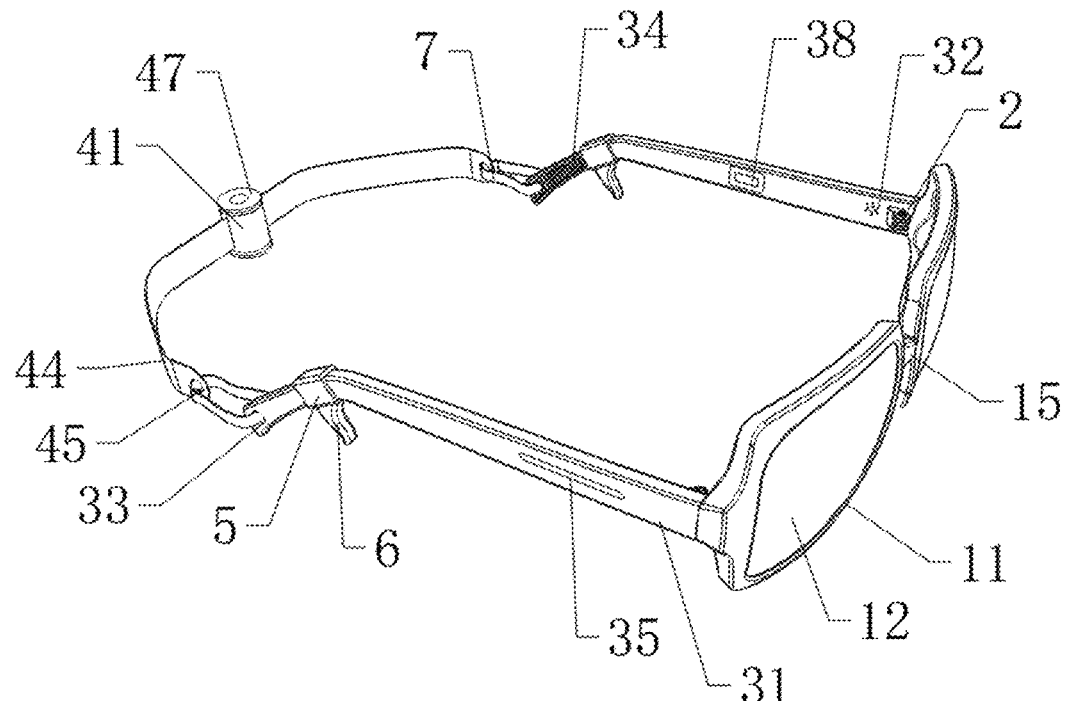
FIG. 2 is a second schematic perspective view of the present invention.
Figure 3:
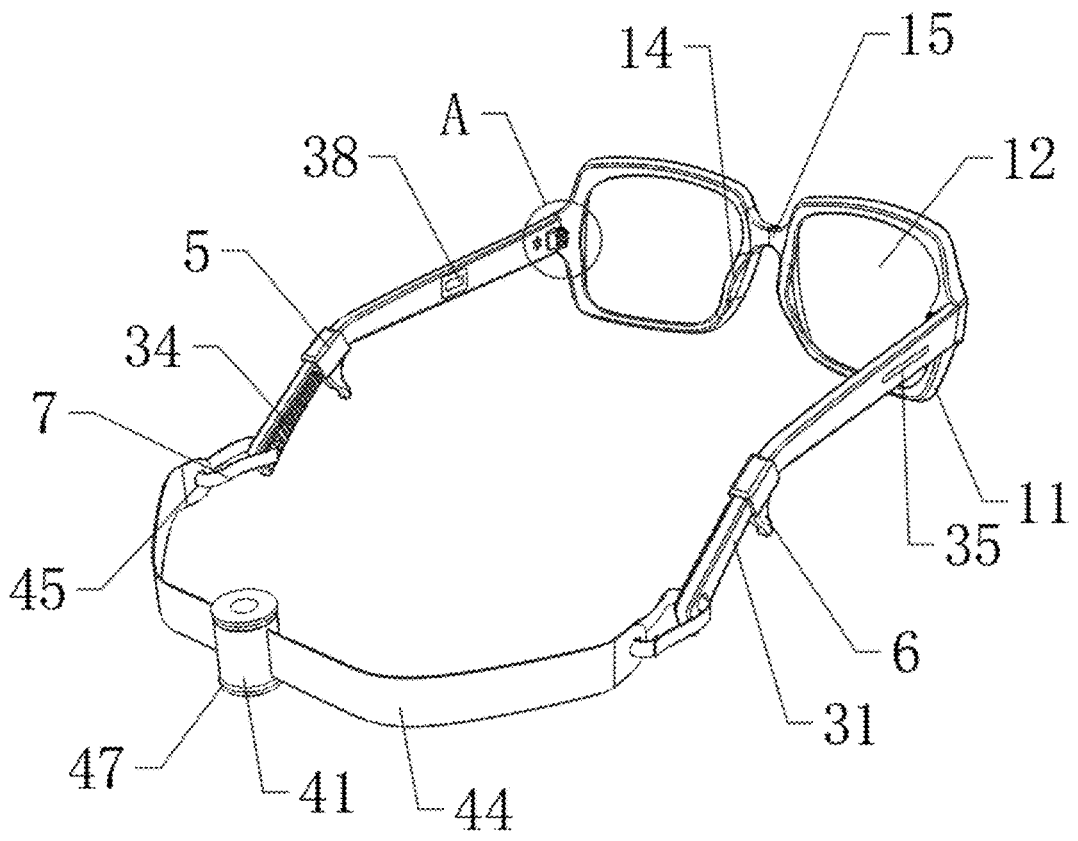
FIG. 3 is a third schematic perspective view of the present invention.
Figure 4:
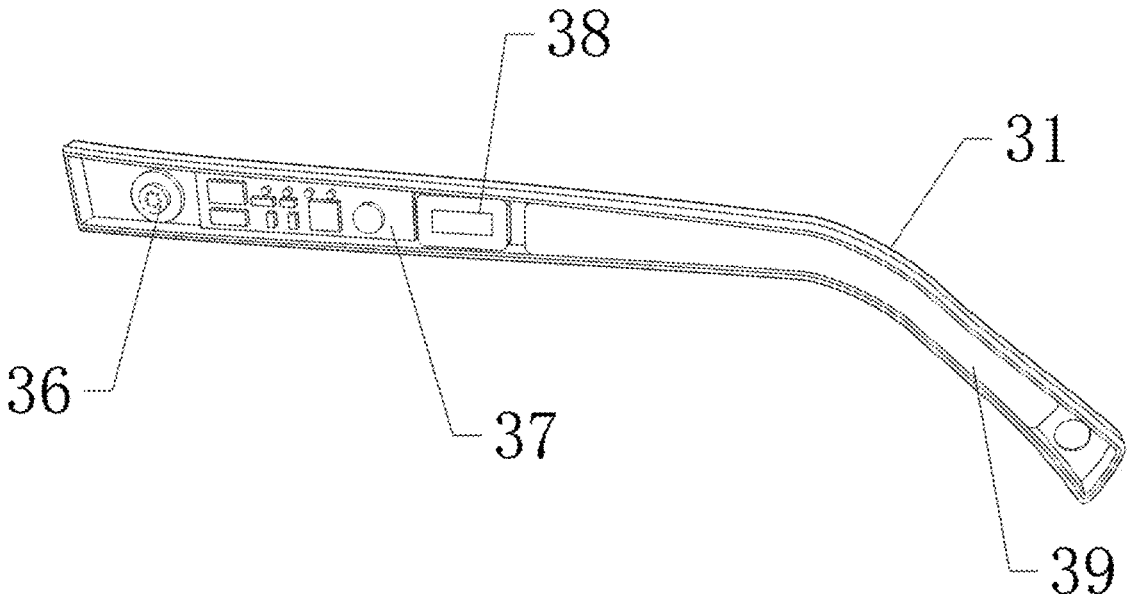
FIG. 4 is a schematic side view of an internal structure of the bone conduction eyeglass leg mechanism of the present invention.
Figure 5:
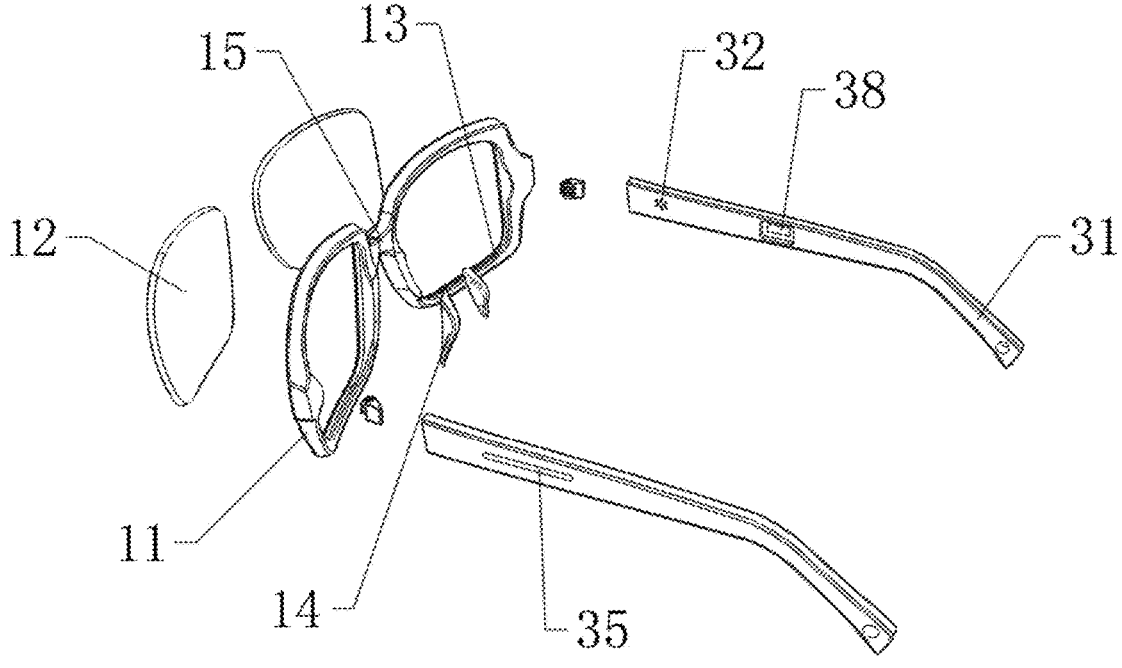
FIG. 5 is a schematic perspective view of a partial explosion of the present invention.
Figure 6:
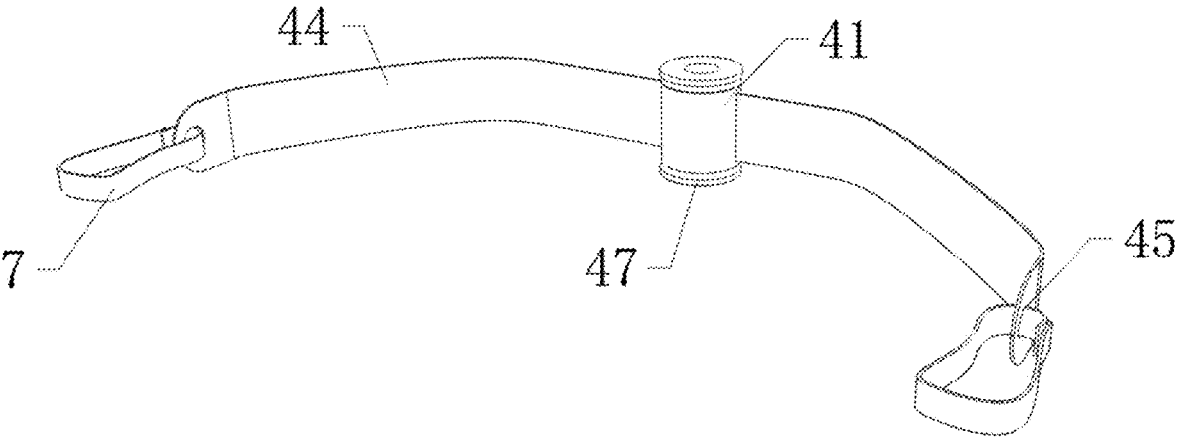
FIG. 6 is a schematic perspective view of the anti-falling mechanism of the present invention.
Figure 7:
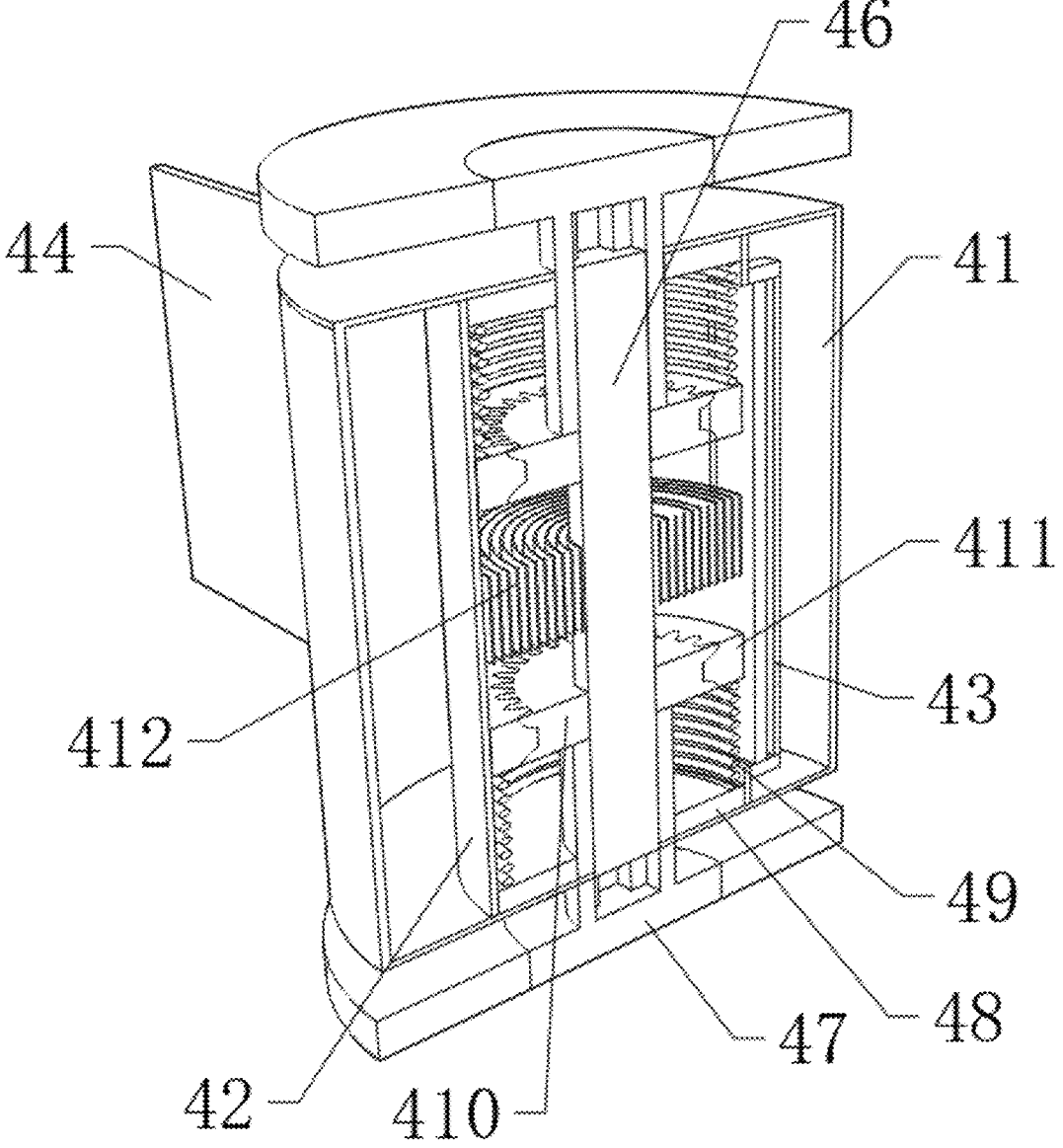
FIG. 7 is a schematic perspective view of an internal structure of a partial side section of the anti-falling mechanism of the present invention.
Figure 8:
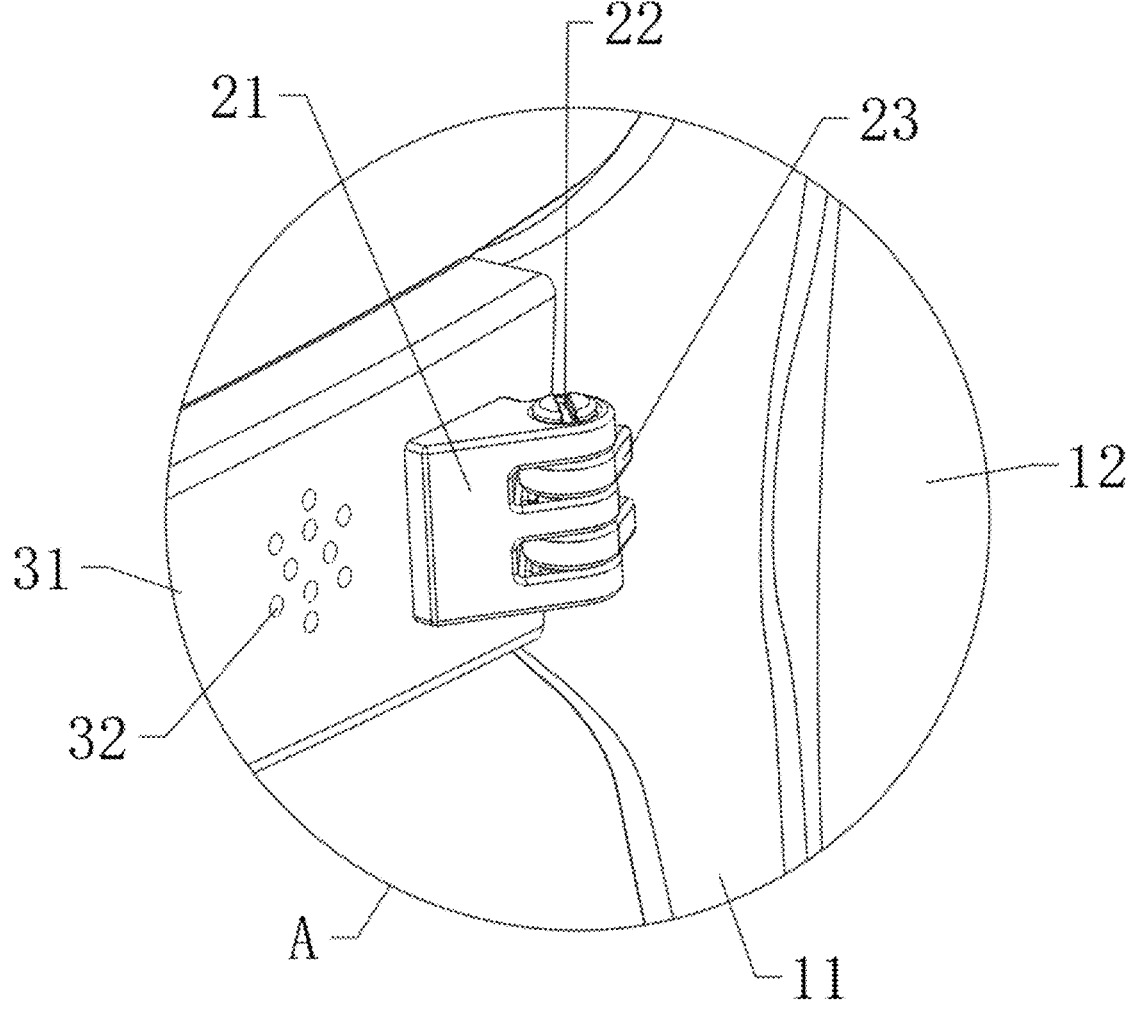
FIG. 8 is an enlarged schematic diagram of a position "A" in FIG. 3 of the present invention.

As shown in FIGS. 1~8, an embodiment of the present invention provides a pair of bone conduction hearing aid eyeglasses, comprising an eyeglass mechanism 1, wherein at middle portions of both rear sides of the eyeglass mechanism 1 are fixedly connected connection mechanisms 2, at sides of the connection mechanisms 2 are fixedly connected bone conduction eyeglass leg mechanisms 3, outside rear-central portions of the bone conduction eyeglass leg mechanisms 3 are sleeved rubber rings 5, at lower end portions of the rubber rings 5 are fixedly connected to rubber hooks 6, at rear end portions of the bone conduction eyeglass leg mechanisms 3 are fixedly provided connecting buckles 7, rear end portions of the connecting buckles 7 are fixedly installed at front end portions of an anti-falling mechanism 4.

The eyeglass mechanism 1 comprises eyeglass frames 11, quantity of the eyeglass frames 11 is two, inside the eyeglass frames 11 are arranged eyeglass lenses 12, inner middle portions of the eyeglass frames 11 are opened mounting grooves 13, lower portions of adjacent ends on rear sides of the eyeglass frames 11 are fixedly connected to nose pads 14, upper end portions of adjacent sides of the eyeglass frames 11 are fixedly connected to two ends of a connecting frame 15, and outer portions of the eyeglass lenses 12 are snap-connected to inner portions of the mounting grooves 13.

The connection mechanisms 2 comprise rotary bases 21, sides of the rotary seats 21 are fixedly connected to front end portions at adjacent sides of the bone conduction eyeglass leg mechanisms 3, inner portions of the rotary seats 21 are rotationally connected to connecting ears 23 through tightening adjustment screws 22, and front sides of the connecting ears 23 are fixedly connected to middle portions of rear sides of the eyeglass frames 11.

The bone conduction eyeglass leg mechanisms 3 comprise eyeglass leg bodies 31, at front end portions of eyeglass leg bodies 31 are evenly distributed through-holes 32, rear end portions of eyeglass leg bodies 31 are provided with first connecting holes 33, rear end portions of eyeglass leg bodies 31 are fixedly connected with anti-falling rubber pads 34, front end openings on sides of eyeglass leg bodies 31 are fixedly connected to touch buttons 35, inside front end portions of the eyeglass leg bodies 31 are fixedly connected sound recognizers 36, front end portions of inner middle portions of the eyeglass leg bodies 31 are fixedly connected to chips 37, inner middle portions of the eyeglass leg bodies 31 are fixedly connected to bone conductors 38, and inner rear sides of the eyeglass leg bodies 31 are fixedly connected to magnetic rechargeable batteries 39.

The magnetic rechargeable batteries 39 are all electronically connected to the sound recognizers 36, the chips 37 and the bone conductors 38 through wires and the chips 37 are all electronically connected to the touch buttons 35, the sound recognizers 36 and the bone conductors 38 through wires.

After putting the bone conduction hearing aid eyeglasses on and simply touching the touch buttons 35, the sound recognizers 36 and bone conductors 38 are activated through the chips 37; external sounds are conducted through the through-holes 32 to the sound recognizers 36, which then transmit sound signals to the chips 37, and then the chips 37 convert the sound signals into vibration signals and transmit them to the bone conductors 38; and then the bone conductors 38 generate vibrations, causing the patient's skull to vibrate and transmit the vibration signals to the cochlea, restoring the sound signals collected by the sound recognizers 36. Bone conduction assemblies are arranged inside the bone conduction eyeglass leg mechanisms 3, which allow patients with hearing impairments and nearsightedness to simultaneously correct their vision and hearing, thereby eliminating the discomfort of wearing both eyeglasses and bone conduction hearing aids at the same time. Moreover, the sound recognizers 36 have recognition sensitivity of −20 dbm, the magnetic rechargeable batteries 39 are rechargeable batteries with magnetic coils, and have capacity more than 100 MA, which ensures that the bone conduction hearing aid eyeglasses can work continuously for over 4 hours, and how the chips 37 convert sound signals into vibration signals and transmit the same to the bone conductors 38 to generate vibration belong to existing technology; In addition, the chips integrate Bluetooth connection function so that cellphones can be connected through Bluetooth, when not in a call or music playback mode, a hearing aid function can be switched, so that the sound recognizers 36 can only recognize spoken voices and not recognize other sounds within a distance of 2 meters to avoid signal interference. By sliding on outer sides of touch buttons 35, intensity of bone conduction can be controlled, thereby adjusting a volume of bone conduction sound. The touch button 35 on a left eyeglass leg body is responsible for music-related functions such as play, pause, previous track, and next track. The touch button 35 on a right eyeglass leg body is responsible for call-related functions such as making calls, redialing, rejecting calls, and adjusting volume.

The anti-falling mechanism 4 comprises a collection bin 41, a middle portion of the collection bin 41 is rotationally connected to a collection ring 42, at a rear-mid portion of the collection ring 42 is opened a bayonet 43, inside the bayonet 43 is fixedly connected a strap 44, both ends of the strap 44 extend through middle opening on both sides of the collection bin 41, at both end portions of the strap 44 are provided second connecting holes 45, a middle portion inside the collection bin 41 is fixedly connected to a cross-shaped fixed sliding pole 46, outside a middle portion of the cross-shaped fixed sliding pole 46 is fixedly connected a rebounder 412, outer portions of the rebounder 412 are fixedly connected to inner middle portions of the collection ring 42, and at both upper and lower end portions of the cross-shaped fixed sliding pole 46 are provided limiting assemblies.

The limiting assemblies comprise pressers 4, inner portions of adjacent ends of the pressers 47 are slidingly connected to outer peripheries of both ends of the cross-shaped fixed sliding poles 46, middle outer peripheries of the pressers 47 are fixedly connected to limiting pieces 48, at adjacent end portions of the limiting pieces 48 are fixedly connected to springs 49, adjacent end portions of the springs 49 are fixedly connected to limiting gear rings 411, and inner portions of the limiting gear rings are meshed with limiting gears 410.

Middle portions of outer peripheries of the pressers 47 are slidingly connected to middle openings of upper and lower ends of the collection bin 41, inner peripheries of the limiting gears 410 are slidingly connected to outer peripheries of upper and lower ends of the middle part of the cross-shaped fixed sliding pole 46, inner peripheries of far-away sides of the limiting gear 410 are fixedly connected to adjacent end portions of the pressers 47, and outer peripheries of the limiting gear rings 411 are fixedly connected to upper and lower ends of middle portions of an inner wall of the collection ring 42.

When a patient wears the bone conduction hearing aid eyeglasses, firstly the rubber rings 5 are slided to appropriate positions on the bone conduction eyeglass leg mechanisms 3, so as to allow the rubber hooks 6 to securely attach to back portions of the patient's ears; then the connecting buckles 7 are installed inside the first connecting holes 33, and the anti-falling mechanism 4 is mounted at both ends within the connecting buckles 7; the pressers 47 are pressed to disengage upper and lower limiting gears 410 from the limiting ring 411 and pull the collection bin, then the strap 44 is pulled out from the collection bin; after that the pressers 47 are released, and the pressers 47 are driven to move away from each other by the limiting pieces 48 and springs 49, thereby re-engaging the limiting gears 410 and limiting gear rings 411 to prevent the strap 44 from retracting into the collection bin 41; after the bone conduction hearing aid eyeglasses is put on the patient's ears and the anti-falling mechanism 4 is placed at a back side of the patient's head, the pressers 47 are pressed again to disengage the limiting gears 410 and the limiting gear rings 411, so that a rebounding force from the rebounder 412 drives the collection ring 42 to rotate inside the collection bin 41, thereby retracting the strap 44 into the collection bin 41 through the bayonet 43 and winding the strap 44 around the collection ring 42's outer periphery; when the collection bin 41 and the strap 44 are fully attached to the back side of the patient's head, the pressers 47 are released to re-engage the limiting gears 410 and limiting gear rings 411, preventing the strap 44 from retracting further into the collection bin 41, automatically retractable anti-falling mechanism 4 is connected to the first connecting holes 33 at rear end portions of the eyeglass leg bodies 31 through the connecting buckles 7, and works in conjunction with the rubber rings 5 and rubber hooks 6, so that the bone conduction hearing aid eyeglasses can be worn without the risk of falling off during intense movements, avoiding damage to the eyeglasses.

Although embodiments of the present invention have been shown and described, those of ordinary skill in the art will understand that various changes, modifications, and substitutions can be made to these embodiments without departing from the principles and spirit of the present invention. The scope of the present invention is limited by the attached claims and their equivalents.

The invention claimed is:

1. A pair of bone conduction hearing aid eyeglasses, comprising an eyeglass mechanism, wherein at middle portions of both rear sides of the eyeglass mechanism are fixedly connected connection mechanisms, at sides of the connection mechanisms are fixedly connected bone conduction eyeglass leg mechanisms, outside rear and intermediate portions of the bone conduction eyeglass leg mechanisms are sleeved rubber rings, at lower end portions of the rubber rings are fixedly connected to rubber hooks, at rear end portions of the bone conduction eyeglass leg mechanisms are fixedly provided connecting buckles, and rear end portions of the connecting buckles are fixedly installed at front end portions of an anti-falling mechanism;

wherein the bone conduction eyeglass leg mechanisms comprise eyeglass leg bodies, at front end portions of eyeglass leg bodies are evenly distributed through-holes, rear end portions of eyeglass leg bodies are provided with first connecting holes, rear end portions of eyeglass leg bodies are fixedly connected with anti-falling rubber pads, front end openings on sides of eyeglass leg bodies are fixedly connected to touch buttons, inside front end portions of the eyeglass leg bodies are fixedly connected sound recognizers, front end portions of inner middle portions of the eyeglass leg bodies are fixedly connected to chips, inner middle portions of the eyeglass leg bodies are fixedly connected to bone conductors, and inner rear sides of the eyeglass leg bodies are fixedly connected to magnetic rechargeable batteries.

2. The pair of bone conduction hearing aid eyeglasses according to claim 1, wherein the eyeglass mechanism comprises eyeglass frames, a quantity of the eyeglass frames is two, inside the eyeglass frames are arranged eyeglass lenses, inner middle portions of the eyeglass frames are opened mounting grooves, lower portions of adjacent ends on rear sides of the eyeglass frames are fixedly connected to nose pads, upper end portions of adjacent sides of the eyeglass frames are fixedly connected to two ends of a connecting frame, and outer portions of the eyeglass lenses are snap-connected to inner portions of the mounting grooves.

3. The pair of bone conduction hearing aid eyeglasses according to claim 1, wherein the connection mechanisms comprise rotary bases, sides of the rotary seats are fixedly connected to front end portions at adjacent sides of the bone conduction eyeglass leg mechanisms, inner portions of the rotary seats are rotationally connected to connecting ears through tightening adjustment screws, and front sides of the connecting ears are fixedly connected to middle portions of rear sides of the eyeglass frames.

4. The pair of bone conduction hearing aid eyeglasses according to claim 1, wherein the magnetic rechargeable batteries are all electronically connected to the sound recognizers, the chips and the bone conductors through wires, and the chips are all electronically connected to the touch buttons, the sound recognizers and the bone conductors through wires.

5. The pair of bone conduction hearing aid eyeglasses according to claim 1, wherein the anti-falling mechanism comprises a collection bin, a middle portion of the collection bin is rotationally connected to a collection ring, at an intermediate portion of a rear portion of the collection ring is opened a bayonet, inside the bayonet is fixedly connected a strap, both ends of the strap extend through middle opening on both sides of the collection bin, at both end portions of the strap are provided second connecting holes, a middle portion of the collection bin is fixedly connected to a cross-shaped fixed sliding pole, outside a middle portion of the cross-shaped fixed sliding pole is fixedly connected a rebounder, outer portions of the rebounder are fixedly connected to inner middle portions of the collection ring, and at both upper and lower end portions of the cross-shaped fixed sliding pole are provided limiting assemblies.

6. The pair of bone conduction hearing aid eyeglasses according to claim 5, wherein the limiting assemblies comprise pressers, inner portions of adjacent ends of the pressers are slidingly connected to outer peripheries of both ends of the cross-shaped fixed sliding poles, middle outer peripheries of the pressers are fixedly connected to limiting pieces, at adjacent end portions of the limiting pieces are fixedly connected to springs, adjacent end portions of the springs are fixedly connected to limiting gear rings, and inner portions of the limiting gear rings are meshed with limiting gears.

7. The pair of bone conduction hearing aid eyeglasses according to claim 6, wherein middle portions of outer peripheries of the pressers are slidingly connected to openings in upper and lower ends of the collection bin, inner peripheries of the limiting gears are slidingly connected to outer peripheries of upper and lower ends of the middle portion of the cross-shaped fixed sliding pole, inner peripheries of the limiting gear are fixedly connected to adjacent end portions of the pressers, and outer peripheries of the limiting gear rings are fixedly connected to upper and lower ends of middle portions of an inner wall of the collection ring.

* * * * *